March 4, 1952 A. ŠPAČEK 2,588,302

METHOD OF AND DEVICE FOR TRANSFORMING AMPLITUDE MODULATION INTO PHASE MODULATION

Filed April 29, 1949

INVENTOR.
ANTONIN ŠPAČEK
BY

Patented Mar. 4, 1952

2,588,302

UNITED STATES PATENT OFFICE 2,588,302

METHOD OF AND DEVICE FOR TRANSFORMING AMPLITUDE MODULATION INTO PHASE MODULATION

Antonín Špaček, Prague-Branik, Czechoslovakia, assignor of one-half to Tesla, National Corporation, Prague, Czechoslovakia Application April 29, 1949, Serial No. 90,526
In Czechoslovakia May 15, 1948

6 Claims. (Cl. 332—1)

This invention relates to a method and device for converting amplitude modulation into phase or frequency modulation in a simple and efficient manner.

An object of the invention is to provide a method of obtaining frequency modulated signals by deriving two high frequency voltages of the same frequency, amplitude modulating one of such voltages and superposing the modulated and unmodulated voltages to produce a frequency modulated output.

Another object is to provide a method of obtaining frequency modulated signals by deriving two voltages of equal frequency but differing in phase and amplitude, amplitude modulating one of said voltages, and superposing the modulated and unmodulated voltages.

Still another object of the invention is a device for obtaining frequency modulation in accordance with the above methods.

The invention will be best understood from the following description to be read in conjunction with the attached drawings in which.

The physical principle underlying the invention will first be explained followed by a description of an example of an actual embodiment of the invention.

The fundamental equation of amplitude modulation is:

$$y(t)=a(1+\alpha \sin \omega t) \sin (\omega_0 t+\varphi) \quad (1)$$

wherein $a$—amplitude of a high frequency carrier wave,
$\alpha$—amplitude modulation depth given by the ratio between the amplitude of the modulation voltage and the amplitude of the voltage of the carrier wave,
$\omega$—$2\pi f_M$, $f_M$ being the frequency of the modulation voltage,
$\omega_0$—$2\pi f_0$, $f_0$ being the frequency of the voltage of the carrier wave.

The fundamental frequency (1) can be rewritten as:

$$y(t)=a \sin (\omega_0 t+\varphi)+\frac{1}{2}a\alpha\left\{\sin\left[(\omega_0+\omega)\cdot t+\varphi-\frac{\pi}{2}\right]-\sin\left[(\omega_0-\omega)\cdot t+\varphi-\frac{\pi}{2}\right]\right\} \quad (2)$$

If, in Equation 2 the expression "$a \sin (\omega_0 t+\varphi)$" is substituted for by the expression $$\text{“}a \sin\left(\omega_0 t+\varphi-\frac{\pi}{2}\right)\text{”}$$

we obtain an equation for phase modulation. Such modulation is undistorted, for practical purposes, if the modulation depth $\alpha$ is sufficiently small.

The above analysis can be embodied by superposing upon the amplitude modulated oscillations according to Equation 2 other oscillations satisfying the following equations:

$$x(t)=-a \sin\left(\omega_0 t+\varphi\right)+a \sin\left(\omega_0 t+\varphi-\frac{\pi}{2}\right) \text{ i. e}$$

$$x(t)=a\sqrt{2}.\sin\left(\omega_0 t+\varphi-\frac{3}{4}\pi\right) \quad (3)$$

Figure 1:
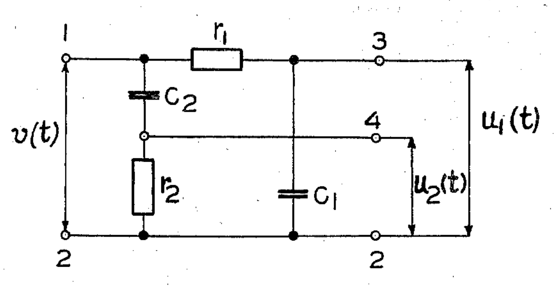
Fig. 1 shows a circuit for obtaining two voltages having the same frequency, but a certain ratio of amplitudes and phases.

The process thus mathematically expressed can be given various physical embodiments of which one especially simple method will be described. Referring to Fig. 1, a high frequency voltage $v(t)$ is impressed on a pair of input terminals 1, 2 of a voltage divider circuit having output terminals 2, 3 and 4. The voltage divider comprises two sections, each including a series connected ohmic resistance and capacitance. Resistance $r_1$ of the first section is connected to input terminal 1, and condenser $C_1$ is connected to input-output terminal 2. The mid-junction point of the first section is connected to output terminal 3.

The condenser $C_2$ of the second divider section is connected to input terminal 1 and the resistance $r_2$ to input-output terminal 2. The mid-junction point of the second section is connected output terminal 4. The voltage divider sections are connected in parallel across input terminals 1, 2.

The output voltage between terminals 2, 3 is $u_1(t)$, and that between terminals 2, 4 is $u_2(t)$. If the high frequency voltage $v(t)$ applied to terminals 1, 2 from a stabilizer oscillator is equal to $b.\sin \omega_0 t$, then $$u_1\cdot t=\frac{b}{\sqrt{1+\omega_0 2 c_1 2 r_1 2}} \sin \{\omega_0 t+\text{arc tg }(-\omega_0 C_1 r_1)\} \quad (4)$$

$$u_1\cdot t=\frac{b\omega_0 C_2 r_2}{\sqrt{1+\omega_0 2 c_2 2 r_2 2}} \sin \left\{\omega_0 t+\text{arc tg }\frac{1}{\omega_0 C_2 r_2}\right\} \quad (5$$

If $C_1$, $C_2$, $r_1$, $r_2$ are chosen so as to meet the requirement $$\omega_0 C_1 r_1=2 \quad (6)$$

$$\omega_0 C_2 r_2=1/3 \quad (7)$$

and if amplitude modulation is carried out for the oscillations (5), then, after superimposing (4), we obtain phase modulation from amplitude modulation.

Figure 2:
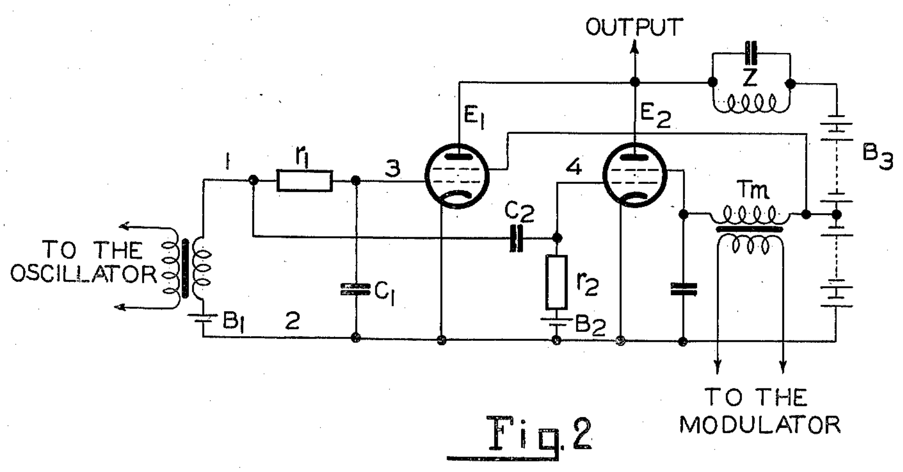
Fig. 2 shows the general circuit arrangement of one example or embodiment of the invention.

One practical embodiment of the invention is shown in Fig. 2 in which the divider sections $r_1C_1$ and $r_2C_2$ are connected in parallel across the secondary of an input transformer having its primary supplied from a stabilized oscillator. The output of $r_1C_1$ is applied to one grid of a pentode $E_1$, and that of $r_2C_2$ is applied to one grid of pentode $E_2$.

The anodes of the two tubes are connected and have a common anode impedance Z which is formed, for example, by a resonant circuit. The bias of the control grid of tube $E_1$ is supplied by battery $B_1$, and the grid bias of tube $E_2$ is supplied by battery $B_2$. The grid bias of the two tubes can, of course, also be obtained by other known means which have not been shown in the drawing being well known to those skilled in the art. Tube $E_1$ acts only as an amplifier or separator, whereas tube $E_2$ also performs another function—namely it provides amplitude modulation. Tubes $E_1$ and $E_2$ must be chosen so that the following conditions should be approximately met.

1. The voltage across the common anode impedance Z must not affect the grid circuits.

2. The mean amplification $g$ must be approximately the same for both tubes.

These conditions can be met, for example by using pentodes, and modulation in tube $E_2$ is accomplished by the screen grid which receives the modulation signal from a modulation transformer $T_m$. The D. C. voltage of the anodes and screen grids of the two tubes is taken from a source which has been shown as battery $B_2$. The primary winding of the modulation transformer $T_M$ is connected to the output of a modulation amplifier.

The amplification of tube $E_1$ equals $g$ in this case, and the amplification of tube $E_2$ equals $g(1+\alpha \sin \omega t)$, where $\omega$ is $2\pi$-times the modulation frequency supplied to the screen grid of the said tube. The modulation frequency is lower than the carrier frequency and the values of the two frequencies must be kept within known limits acceptable with frequency modulation.

If the above conditions are satisfied, there appears across the anode impedance Z a resulting voltage $$u(t)=gu_1(t)+g(1+\alpha \sin \omega t)\cdot u_2(t) \quad (8)$$

If $C_1$, $C_2$, $r_1$, $r_2$ are given such values that $$\omega_0C_1r_1=2$$

and $$\omega_0C_2r_2=\frac{1}{3}$$

then, for a sufficiently small $\alpha$ Equation 8 represents a phase modulation which is distortionless for practical purposes. This can be easily proved by substituting for $u_1(t)$ and $u_2(t)$ from Equations 4 and 5 and by comparison with Equations 2 and 3.

Therefore, the system of voltage dividers $r_1C_1$ and $r_2C_2$ supplies to the control grid of tube $E_1$ a voltage whose amplitude is $\sqrt{2}$-times greater than the voltage at the control grid of tube $E_2$ and lagging behind it by 3/8 of the time duration of one cycle—i. e. by 3/4 $\pi$, as can be readily proved. Since the working conditions of both tubes $E_1$ and $E_2$ are the same, the ratio of the amplitudes and the phase difference of both direct current voltages at the anodes will be the same as at the grids, the only difference being that the direct current voltage at the anode $E_2$ will be amplitude modulated.

The frequency modulated signal produced by superposition of the two voltages across impedance Z can be further amplified or multiplied, as required.

It is, of course, obvious that suitably dimensioned inductances, in the proper sequence, can be employed instead of capacities $C_1$ and $C_2$.

The above described embodiment is, of course, only one example of a great number of possibilities by means of which a frequency modulated signal can be obtained by superposition of an unmodulated signal and an amplitude modulated signal, both signals having the same frequency and the proper amplitude ratio and phase difference, as above mentioned.

We claim:

1. Signalling apparatus, having a frequency modulated output, comprising, in combination a source of potential of fundamental frequency; a pair of voltage divider sections connected in parallel to such source and having relative values such that the two voltages thus produced are identical in frequency, have an amplitude ratio equal to $\sqrt{2}$, and the voltage of greater amplitude lags that of lesser amplitude by $3\pi/4$; means for amplitude modulating the voltage of lesser magnitude; and means for superposing the amplitude modulated voltage upon the unmodulated voltage to obtain a frequency modulated output.

2. Signalling apparatus, having a frequency modulated output comprising in combination a source of potential of fundamental frequency; a pair of voltage divider sections connected in parallel to such source and having relative values such that the two voltages thus produced are identical in frequency, have an amplitude ratio equal to $\sqrt{2}$, and the voltage of greater amplitude lags that of lesser amplitude by $3\pi/4$; means for applying the voltage of greater magnitude to the input of a first grid-controlled electronic valve; means for applying the voltage of lesser magnitude to the input of a second grid-controlled electronic valve; a source of amplitude modulations; means connecting the last named source to a grid of said second valve; and a common output impedance connected to said valves.

3. Signalling apparatus having a frequency modulated output comprising in combination a source of potential of fundamental frequency; a pair of voltage divider sections connected in parallel to such source and having relative values such that the two voltages thus produced are identical in frequency, have an amplitude ratio equal to $\sqrt{2}$, and the voltage of greater amplitude lags that of lesser amplitude by $3\pi/4$; means for applying the voltage of greater magnitude to the input of a first grid-controlled electronic valve; means for applying the voltage of lesser magnitude to the input of a second grid-controlled electronic valve; a source of amplitude modulations; means connecting the last named source to a grid of said second valve; and a common output impedance connected to the anodes of said valves.

4. Apparatus as claimed in claim 3 in which each of said divider sections comprises a series connected ohmic resistance and a capacitance.

5. Apparatus as claimed in claim 3 in which each of said divider sections comprises a series ohmic resistance and a capacitance; the ohmic resistance of one section and the capacitance of the other being commonly connected to one terminal of said potential source and the capacitance of such one section and ohmic resistance of the other being commonly connected to the other terminal of the potential source.

6. Apparatus as claimed in claim 3 in which each of said divider sections comprises a series connected ohmic resistance and a capacitance; the ohmic resistance of one section and the capacitance of the other being commonly connected to one terminal of said potential source and the capacitance of such one section and ohmic resistance of the other being commonly connected to the other terminal of the potential source; and the mid junction point of each divider section being connected to its respective valve input.

ANTONÍN ŠPAČEK.

REFERENCES CITED

The following references are of record in the file of this patent:

UNITED STATES PATENTS

| Number | Name | Date |
|---|---|---|
| 2,027,044 | Hofer et al. | Jan. 7, 1936 |
| 2,378,581 | Roberts | June 19, 1945 |
| 2,483,262 | Cosman | Sept. 27, 1949 |